United States Patent
Mollen

(10) Patent No.: US 9,512,020 B2
(45) Date of Patent: Dec. 6, 2016

(54) DEVICE FOR DISTRIBUTING GASES IN LIQUIDS

(71) Applicant: NORRES Beteiligungs-GmbH, Gelsenkirchen (DE)

(72) Inventor: Burkhard Mollen, Essen (DE)

(73) Assignee: Norres Beteiligungs-GmbH, Gelsenkirchen (DE)

( * ) Notice: Subject to any disclaimer, the term of this patent is extended or adjusted under 35 U.S.C. 154(b) by 112 days.

(21) Appl. No.: 14/319,796

(22) Filed: Jun. 30, 2014

(65) Prior Publication Data

US 2015/0001744 A1  Jan. 1, 2015

(30) Foreign Application Priority Data

Jul. 1, 2013 (DE) .................. 10 2013 106 845

(51) Int. Cl.
*B01F 3/04* (2006.01)
*C02F 1/74* (2006.01)

(52) U.S. Cl.
CPC ............. *C02F 1/74* (2013.01); *B01F 3/0412* (2013.01); *B01F 3/04106* (2013.01); *B01F 3/04269* (2013.01); *B01F 2003/04312* (2013.01)

(58) Field of Classification Search
CPC ..... B01F 3/04; B01F 3/04099; B01F 3/04106; B01F 3/04269; B01F 3/0412; B01F 2003/04184; B01F 2003/04312

USPC .......................... 261/119.1, 121.1, 124, 126
See application file for complete search history.

(56) References Cited

U.S. PATENT DOCUMENTS

| | | | |
|---|---|---|---|
| 2002/0003314 A1* | 1/2002 | Cantz | B01F 3/04269 261/124 |
| 2014/0264965 A1* | 9/2014 | Jager | B01F 3/04269 261/64.1 |

FOREIGN PATENT DOCUMENTS

| | | |
|---|---|---|
| DE | 4421211 C2 | 1/1996 |
| DE | 19516395 A1 | 11/1996 |
| DE | 19836291 A1 | 2/2000 |
| DE | 202006004514 U1 | 7/2006 |
| WO | 2007051150 A2 | 5/2007 |

* cited by examiner

*Primary Examiner* — Robert A Hopkins
(74) *Attorney, Agent, or Firm* — The Webb Law Firm

(57) ABSTRACT

A device for distributing gases in liquids, comprising: an aerating element made out of plastic, with an upper side and a lower side joined with the upper side, a support element, and a gas inlet, wherein the aerating element comprises at least one cavity that can be filled with gas through the gas inlet, wherein at least the area of the upper side of the aerating element comprises holes, perforations or the like as the gas outlet, and wherein the support element is situated in the cavity of the aerating element. In order to enable a uniform and reliable aeration of larger water surfaces in a cost-effective manner, it is proposed that the width of the support element be greater than its height.

17 Claims, 4 Drawing Sheets

DEVICE FOR DISTRIBUTING GASES IN LIQUIDS

CROSS-REFERENCE TO RELATED APPLICATION

This application claims priority to German Patent Application No. 10 2013 106 845.6 filed Jul. 1, 2013, the disclosure of which is hereby incorporated in its entirety by reference.

BACKGROUND OF THE INVENTION

Field of the Invention

The invention relates to a device for distributing gases in liquids, comprising: an aerating element made of plastic, with an upper side and a lower side joined with the upper side, a support element, and a gas inlet, wherein the aerating element comprises at least one cavity that can be filled with gas through the gas inlet, wherein at least the area of the upper side of the aerating element comprises holes, perforations or the like as the gas outlet, and wherein the support element is situated in the cavity of the aerating element.

Description of Related Art

The progression of many biological or chemical processes is also determined among other factors by the gas content of the liquids involved in the processes. The solubility of gases in liquid depends on several parameters, for example the temperature and pressure. For this reason, the gas content of liquids can be influenced and varied until a saturation limit has been reached. Different solutions are known for this purpose. Some of these solutions relate to distributing gases in liquids to increase the gas content of the liquid. For example, a higher oxygen content in the water is desired in fish farming or purification plants, to which end the basins are aerated. When aerating liquids, an attempt is generally made to generate especially numerous, small air bubbles, and distribute the latter uniformly in the liquid, since as a result the boundary surface between air and water is larger than given a few large air bubbles, and the air can dissolve especially well in the water (diffusion).

Various solutions are known for distributing gases in liquids, in particular for aerating liquids. For example, a flat aerating mat made out of plastic is known from WO 2007/051150 A2. The aerating mat consists of a perforated upper film and a lower film, which are joined with each other in an adhesive bonding or welding process in such a way that several oblong cavities or chambers form between the upper film and lower film. Apart from the perforation, the aerating mat thus exhibits similarities to an air mattress. In order to aerate liquids, the aerating mat can be stretched out in a frame, for example one placed on the bottom of a water basin. The flat design of the aerating mats makes it possible to achieve a uniform bubble distribution. Several aerating mats placed back-to-back and side-by-side can be used to aerate larger surfaces.

The disadvantage to aerating mats known from WO 2007/051150 A2 is that the adhesively bonded or welded seams represent weak points. Since the upper film must expand to open the holes, the danger becomes that the aerating mat will be unable to withstand the high internal pressure in the area of the welded joints or seams. In particular, cracks may form in proximity to the welded seams, since the films strongly expand in this region, while almost no expansion can take place in the area of the welded seam itself. As a consequence, the film tears in the area of the welded joints or seams, and the aerating mat fails.

Another disadvantage lies in the fact that such aerating mats are complicated and expensive to manufacture, for example since ultrasound or high-frequency welding devices must be used for welding together the upper film and lower film.

Also known for aerating liquids are so-called "tube aerators", for example those described in DE 20 2006 004 514 U1. Involved here is a flexible, perforated plastic hose that is slipped over a cylindrical tube serving as the support tube. The circumference of the perforated hose is only slightly larger than the circumference of the support tube, so that the perforated hose wall tightly abuts against the support tube. The perforated hose is sealed off from the support tube at both ends. Air can be supplied from inside by way of a line or hose via an opening provided in the support tube, so that the perforated hose is lifted from the support tube and expands. The air can exit the numerous small holes in the flexible hose in the form of small bubbles.

Known tube aerators have the disadvantage of a bubble distribution unsuitable for aerating larger surfaces. The cylindrical shape of the support tube and flexible hose do offer the advantage of uniformly expanding when exposed to pressure. However, one disadvantage to circular cross sections is that the air exits the hose in a radial direction, causing a portion of the air to also exit toward the bottom and side. As a result, circular cross sections cannot be used to uniformly distribute the bubbles over a flat surface, for example over the bottom of a water basin. Another disadvantage to tube aerators with cylindrical support tubes lies in the fact that the support tube exhibits a cavity. The air present in the cavity generates buoyancy, thereby hampering the assembly of tube aerators underwater. In order to balance out this disadvantage, the cavities are often filled with concrete, sand or the like. However, this leads to another disadvantage, since the filling makes it more complicated and expensive to manufacture and transport the tube aerators. Finally, another disadvantage of tube aerators involves the intricate piping. Each individual tube aerator must have its own air connection, and thus is only clamped on one side. In addition, tube aerators often have very high buoyant forces (with the cavity not filled) or very high downforces (e.g., when filled with concrete). In combination with the unilateral clamping, both lead to very high torque loads, so that very stable, and hence very expensive, piping must be installed.

SUMMARY OF THE INVENTION

The object of the invention is to configure and further develop the device mentioned at the outset and described in greater detail above in such a way as to cost-effectively enable a uniform and reliable aeration of larger water surfaces.

By having the width of the support element exceed its height in accordance with the invention, the aeration element is also shaped in such a way that its width exceeds its height. This is because the shape of the aerating element is determined by the support element, since the support element is located in the cavity of the aerating element.

According to the invention, in particular no support elements with a circular or square cross section are thus to be used. Flat support elements are to be used instead. In particular circular cross sections had previously been desired in aerators ("tube aerators"), since the flexible aerating elements tend to have the shape of a sphere, i.e., a circular cross section, with rising internal pressure anyway. In other words, circular cross sections have proven to be especially dimensionally stable at a high internal pressure. In a departure from this teaching, the invention takes a different approach: So that larger water surfaces can be uniformly aerated, the aerating element is deliberately forced to have a flat shape, and largely prevented from expanding like a balloon. Another advantage to a flat expansion of the support and aerating element lies in the fact that the upper side of the aerating element is no longer curved or bent, but rather can proceed nearly flat, and hence parallel to the water surface. This enables a targeted exit by the air bubbles in the desired direction, namely in the direction of the water surface. Finally, a flat support element permits an especially flat design for the device. The advantage to this is that the device can be mounted very tightly to the bottom of a basin, so that the air bubbles exiting the device remain in the water for an especially long time.

One embodiment of the invention provides that the support element has a higher stiffness than the aerating element, in particular than the upper side and lower side of the aerating element. The greater the difference between the stiffness of the support element and aerating element, the more the shape of the device is determined by the stiffer of the two components. The objective of this embodiment is to have the support element be stiffer than the aerating element. The advantage to this is that a very pliable, flexible material can be selected for the aerating element, the shape of which is largely determined by the stiff support element.

Another instruction of the invention provides that the support element is a plate made out of plastic or metal. The advantage to plates is that they can exhibit a large planar expansion despite having a very low thickness. In this way, a large water surface can be aerated at a slight materials usage and low cost. The small thickness has the additional advantage that a very low overall height can be achieved, so that the devices can be mounted on the bottom of a basin with minimum space requirements, and do not collide with other systems, for example a mixing system of a clarifying basin. Metal plates have a very high stiffness; plastic plates are inexpensive and also suitable for prolonged use underwater.

With respect to the dimensions, another embodiment of the invention provides that the height of the support element ranges from 1 mm to 4 mm, and that the width of the support element measures at least 5 cm, in particular at least 8 cm. In this embodiment, the objective is thus to have the support element be significantly wider than it is high. The width of the support element is preferably at least 10 times, in particular at least 30 or at least 50 times larger than its height. The greater the width/height ratio, the more the advantages of flat support elements described above can be utilized, for example aerating large water surfaces at a low material usage.

In order to further improve the support element, an embodiment of the invention proposes that the support element is solid and has no cavities. The advantage to this is that it diminishes the buoyancy of the device, thereby readily enabling assembly on the bottom of a water basin. In particular, there is no need for a time-consuming process of filling cavities with concrete, sand or the like, which is routinely required for tube aerators with cylindrical tubes.

An embodiment of the invention provides that the width of the support element measure at least 80%, in particular at least 90% of the width of the aerating element. If the aerating element exhibits a continuous cross section, e.g., given a hose, reference can be more precisely made to a circumference of the aerating element instead of the width. In this case, it is provided that the width of the support element measure at least 40%, in particular at least 45% of the circumference of the aerating element. Due to the mentioned dimensional correlations for the support element and aerating element, the aerating element sits very tightly on the support element, which stretches it very far in the lateral direction, so that the aerating element reaches roughly its maximum width. This also serves the purpose of being able to aerate as large a water surface as possible with a limited material usage. In addition, the tautly stretched aerating element makes it possible to achieve a nearly planar surface, allowing the air bubbles to specifically exit in the direction of the water surface.

A further instruction of the invention provides that the aerating element is manufactured out of a plastic film. In particular, the aerating element can be made out of PUR (polyurethane), EPDM (ethylene-propylene-diene-monomer-rubber), rubber or silicone. Plastic films are distinguished by a high flexibility, and can thus be molded into a variety of shapes by the support element. In addition, plastic films are inexpensive and also last a long time underwater. Finally, once fabricated, plastic films are especially easy to provide with perforations, holes or the like, through which the air is to exit the aerating element in the form of small bubbles.

Another embodiment of the invention provides that the upper side and lower side of the aerating element are seamlessly joined together. Seamless aerating elements increase pressure resistance. In addition, they eliminate the costs for welding or adhesive bonding processes, in which the upper side and lower side are usually joined together. For example, seamless aerating elements can be obtained in extrusion processes.

Another embodiment of the invention provides that the aerating element is a hose. The advantage here is that manufacture is simple and inexpensive, and the length can be variably configured. In addition, hoses only have to be sealed at both ends, and are otherwise routinely already watertight. A further advantage lies in the fact that the support element can be easily inserted into a hose. In addition, the support element can also mold expandable hoses into a shape deviating from the classic circular cross section.

A further embodiment of the invention provides that the two ends of the hose are sealed airtight by a clamp, in particular a metal claim. Clamping makes it possible to either directly press together the ends of the hose, or press them from both sides onto the support element so as to seal the hose end. In order to improve the seal and not damage the hose ends, the clamps can be fitted with a flexible material, for example rubber, as the sealing element. The sealing element can take the form of a toroidal sealing ring or flat gasket. The clamps are preferably tightened with screws. In addition, the clamps can comprise through holes to secure the entire device to a ground via the clamps.

With regard to this embodiment of the invention, it is also proposed that the gas inlet of the device be situated in the area of the clamp. In particular, the clamp itself can comprise a gas inlet. For example, this case can involve a recess through which a hose can be introduced into the aerating element.

As an alternative to this embodiment, it is provided that the two ends of the hose are sealed airtight by an end fitting made of plastic, in particular thermoplastic polyurethane. A cast or extruded end fitting is preferably involved. To this end, the aerating element and, if necessary, the supporting element are held in a casting or injection mold at their ends to be sealed, which are then filled with hot, (viscous) liquid plastic. After a cooling process, the plastic is cured, and the end of the hose is sealed airtight. In other words, the hose ends are encapsulated with plastic via casting or injection molding. The end fittings can preferably exhibit a flat lower side, so that the end fittings can simultaneously be used as feet, with which the device can be placed on a ground, for example the bottom of a water basin.

With regard to this embodiment, it is further suggested that the gas inlet of the device be integrated into the end fitting. The gas connection can be integrated into the end fitting by inserting a core into the casting or injection mold, which is shaped like the gas connection, and is again removed from the end fitting after the plastic has cured. In addition to the gas connection, a threaded connector for a hose can also be integrated into the end fitting. As an alternative, the hose or line used to supply gas to the device can be encapsulated via casting or injection molding, and thereby integrated into the end fitting. The advantage to integrating the gas connection or other components into the end fitting is that it produces an especially reliable seal, even at high pressures.

Another embodiment of the invention provides that the lower side of the aerating element is airtight, and in particular comprises no holes, perforations or the like. The advantage to this is that all of the air can exit the device via the perforated upper side of the aerating element, making it possible to achieve a particularly uniform bubble distribution. In addition, an airtight lower side prevents large air bubbles from forming on the lower side of the device, and their buoyancy from pressing the latter toward the water surface. Finally, a non-perforated area has a higher stiffness than a perforated area, so that expansion on the lower side is lower than on the upper side. The advantage to this is that the upper side arches more strongly when exposed to an internal pressure than the lower side, making it possible to achieve an even better distribution of air bubbles on the upper side.

According to another instruction of the invention, it is proposed that the upper side of the aerating element comprises perforated areas interrupted by airtight strips that run in the longitudinal and/or transverse direction of the aerating element. This also has the effect of the upper side arching outwardly more strongly in the less stiff perforated areas than in the area of the stiffer, airtight strips. In turn, the advantage here involves an improved distribution of air bubbles.

Finally, a further embodiment of the invention suggests that a rail be provided for accommodating and stiffening the device. The rail makes it possible to increase the stiffness of the device. In particular in very long devices or devices with pliable support elements, this has the advantage of preventing uncontrolled deformation given a high internal pressure or strong flow of water. The rail can be permanently secured to the bottom of a water basin, so that the aerating element with the support element can be clamped into the rail if needed. As an alternative, the rail can also be assembled and disassembled together with the aerating element and support element.

BRIEF DESCRIPTION OF THE DRAWINGS

The invention will be explained in more detail below based on a drawing, which only depicts a preferred exemplary embodiment. The drawing shows.

DESCRIPTION OF THE INVENTION

Figure 1:
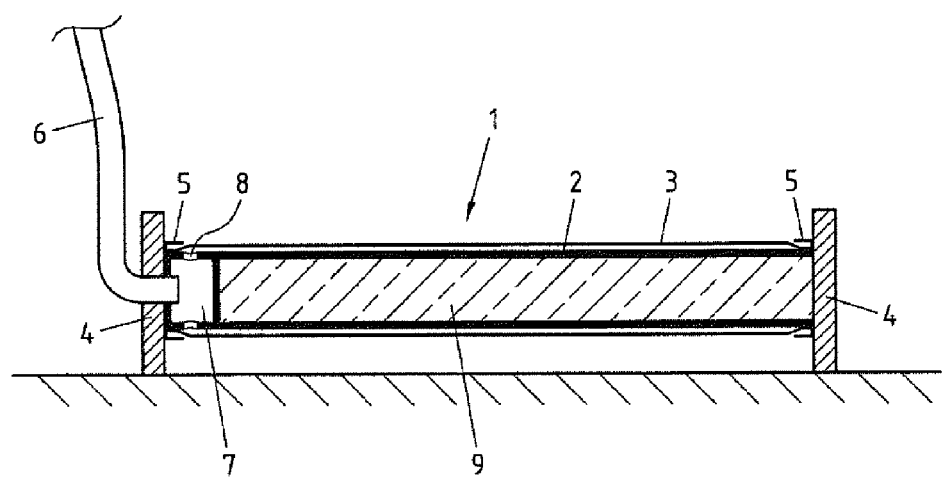
FIG. 1 A tube aerator known from prior art.

FIG. 1 shows a tube aerator known from prior art. The tube aerator 1 depicted on FIG. 1 largely corresponds to the tube aerator shown on FIG. 3 of DE 20 2006 004 514 U1. The tube aerator 1 encompasses a cylindrical tube 2 over which a perforated hose 3 is slipped. Both ends of the tube aerator 1 are provided with disks 4 having receptacles 5 that accommodate the hose 3 and seal it away from the tube 2. Air can stream into a distribution chamber 7 through a line 6, and from there be distributed via radial boreholes 8 into the gap between the tube 2 and perforated hose 3. Given a high enough internal pressure, the air can exit the tube aerator 1 through the holes provided in the hose 3. Finally, the tube aerator 1 exhibits a cavity 9 filled with concrete.

Figure 2A:
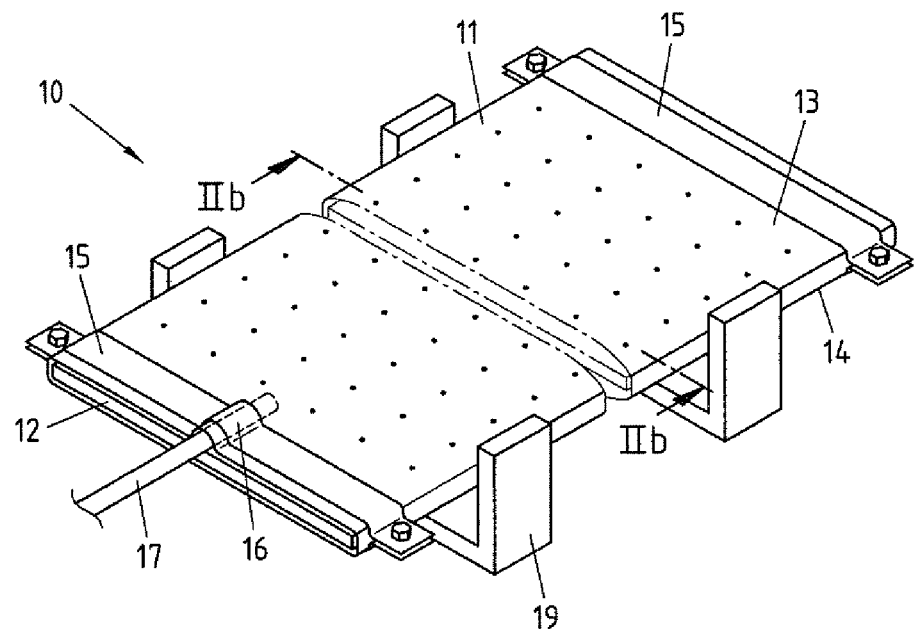
FIG. 2a A perspective view depicting a first embodiment of a device according to the invention for distributing gases in liquids, FIG. 2b The device from FIG. 2a in a cross section along intersecting plane IIb-IIb marked on FIG. 2a, FIG. 3a A perspective view depicting a second embodiment of a device according to the invention for distributing gases in liquids, FIG. 3b The device from FIG. 3a in a cross section along intersecting plane IIIb-IIIb marked on FIG. 3a, FIG. 4a A perspective view depicting a first alternative embodiment of an aerating element for a device according to the invention for distributing gases in liquids, and FIG. 4b A perspective view depicting a second alternative embodiment of an aerating element for a device according to the invention for distributing gases in liquids.

FIG. 2a shows a perspective view depicting a first embodiment of a device 10 according to the invention for distributing gases in liquids. The device 10 comprises an aerating element 11, which in the device 10 exemplarily illustrated on FIG. 2 is designed as a plastic hose. In addition, the device 10 comprises a support element 12, which in the device 10 shown is a plastic plate. The support element 12 is situated in the aerating element 11, and determines its shape. The aerating element 11 comprises a perforated upper side 13 and an airtight, non-perforated lower side 14. At the two ends of the device 10, the aerating element 11 is sealed away from the support element 12 by metal clamps 15. To this end, the metal clamps 15 can exhibit seals, in particular rubber seals.

One of the clamps 15 comprises an air inlet 16, through which a line 17 is guided from outside into a cavity 18 (not shown on FIG. 2a) that forms between the aerating element 11 and support element 12. The device is stiffened by two rails 19, and fixed to the substrate, for example the bottom of a water basin.

Figure 2B:
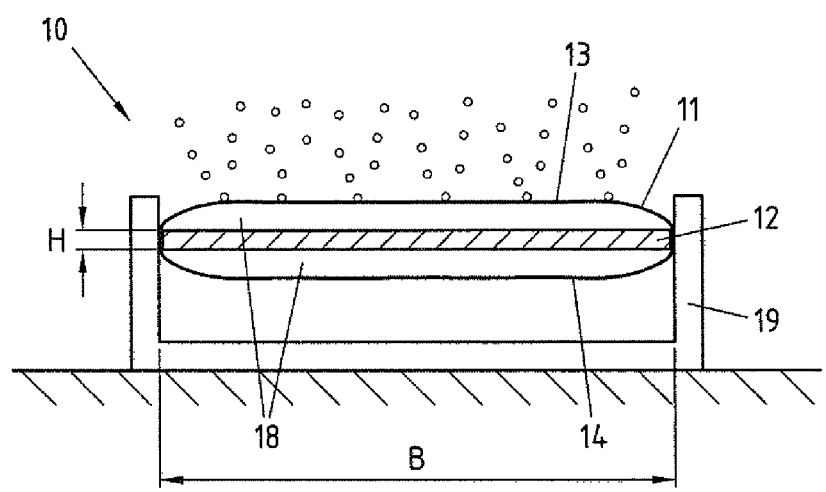

FIG. 2b shows the device 10 from FIG. 2a in a cross section along intersecting plane IIb-IIb marked on FIG. 2a. The areas already described in conjunction with FIG. 2a are provided with the corresponding reference numbers on FIG. 2b and all other figures. As clearly evident from the depiction selected on FIG. 2b, the aerating element 11 designed as a seamless hose completely envelops the support element 12, and cavities 18 that can be filled with compressed air form both between the upper side 13 and support element 12 and between the lower side 14 and support element 12.

The support element 12 or the rectangular cross sectional surface of the support element 12 shown on FIG. 2b exhibits a width B and a height H, wherein the width B is noticeably greater than the height H. The width B of the support element 12 preferably measures at least 80%, in particular at least 90% of the width of the aerating element 11, so that the aerating element 11 is stretched over the support element 12, and must largely adjust to its shape. In relation to the circumference of the aerating element 11, the width B of the support element 11 measures at least 40%, in particular at least 45% of the circumference of the aerating element 11. The width B preferably measures at least 5 cm, in particular at least 8 cm, while the height H preferably ranges between 1 mm and 4 mm.

Figure 3A:
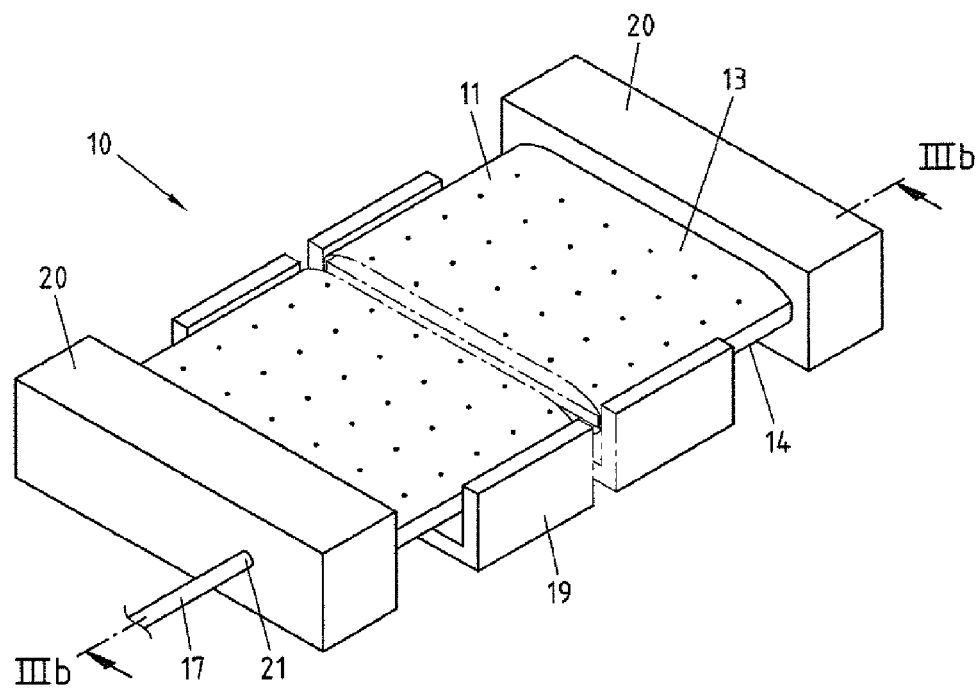

FIG. 3a shows a perspective view depicting a second embodiment of a device 10 according to the invention for distributing gases in liquids. The essential difference relative to the first embodiment shown on FIGS. 2a and 2b lies in the fact that the two ends of the device 10 are not sealed by clamps, but rather by end fittings 20. For example, the end fittings 20 can be extruded or cast out of a plastic. The air inlet 16 (not depicted on FIG. 3a) and threaded connector 21 are integrated in one of the two end fittings 20, so that the line 17 can be directly screwed together with the end fitting 20. Another difference from the first embodiment lies in the fact that only one rail 19 is used. However, the number and length of the rails 19 can be identical in both embodiments, and be adjusted depending on the length of the device 10.

Figure 3B:
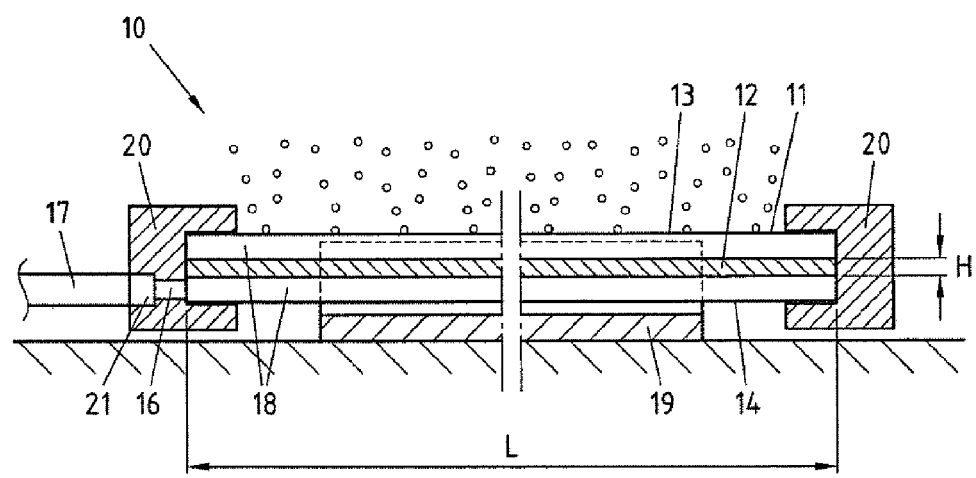

FIG. 3b shows the device 10 from FIG. 3a in a cross section along intersecting plane IIIb-IIIb marked on FIG. 3a. The areas already described in conjunction with FIG. 3a are provided with the corresponding reference numbers on FIG. 3b and all other figures. The support element 12 or the rectangular cross sectional surface of the support element 12 shown on FIG. 2b exhibits a length L and a height H, wherein the length L is noticeably greater than the height H. The length L preferably measures at least 75 cm, in particular at least 1 m.

Figure 4A:
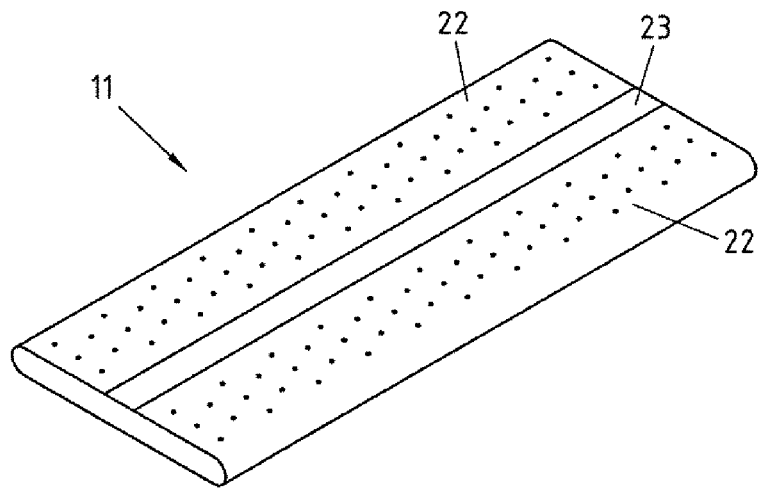
Figure 4B:
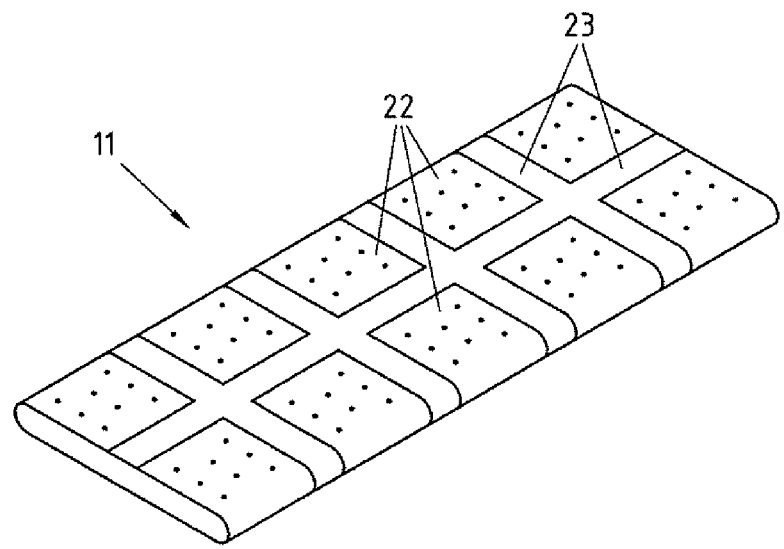

FIGS. 4a and 4b show a perspective view depicting a first and second alternative embodiment of an aerating element 11 for a device according to the invention for distributing gases in liquids. One characteristic feature of these aerating elements 11 designed as plastic hoses lies in the fact that the upper side 13 of the aerating elements 11 is not entirely perforated. The upper side 13 of the aerating elements 11 can instead be divided into perforated areas 22 and non-perforated, airtight strips 23. The embodiment illustrated on FIG. 4a only provides an airtight strip 23 that runs in the longitudinal direction of the aerating element 11 and is bordered on both sides by perforated areas 22. The embodiment depicted on FIG. 4b is additionally provided with several airtight strips 23 that run in the transverse direction of the aerating element 11. In this embodiment, each perforated area 22 is thus bordered by several airtight strips 22, of which one runs in the longitudinal direction, and at least one runs in the transverse direction of the aerating element 11.

REFERENCE LIST

1: Tube aerator
2: Tube
3: Hose
4: Disk
5: Receptacle
6: Line
7: Distribution chamber
8: Borehole
9: Cavity
10: Device
11: Aerating element
12: Support element
13: Upper side
14: Lower side
15: Metal clamp
16: Air inlet
17: Line
18: Cavity
19: Rail
20: End fitting
21: Threaded connector
22: Perforated area
23: Airtight strip
B: Width of support element
H: Height of support element
L: Length of support element

The invention claimed is:

1. A device for distributing gases in liquids, comprising:
an aerating element made out of plastic, with an upper side and a lower side joined with the upper side,
a solid support element configured to separate the upper side of the aerating element from the lower side of the aerating element, and
a gas inlet,
wherein the aerating element comprises at least one cavity that can be filled with gas through the gas inlet,
wherein at least the area of the upper side of the aerating element comprises holes or perforations as the gas outlet, and
wherein the support element is situated in the cavity of the aerating element, wherein the width of the support element is greater than its height.

2. The device according to claim 1, wherein the support element has a higher stiffness than the aerating element.

3. The device according to claim 1, wherein the support element is a plate made out of plastic or metal.

4. The device according to claim 1, wherein the height of the support element ranges from 1 mm to 4 mm.

5. The device according to claim 1, wherein the width of the support element measures at least 5 cm.

6. The device according to claim 1, wherein the support element has no cavities.

7. The device according to claim 1, wherein the width of the support element measures at least 80% of the width of the aerating element.

8. The device according to claim 1, wherein the aerating element is manufactured out of a plastic film.

9. The device according to claim 1, wherein the upper side and lower side of the aerating element are seamlessly joined together.

10. The device according to claim 1, wherein the aerating element is a hose.

11. The device according to claim 10, wherein the two ends of the hose are sealed airtight by a clamp.

12. The device according to claim 11, wherein the gas inlet of the device is situated in the area of the clamp.

13. The device according to claim 10, wherein the two ends of the hose are sealed airtight by an end fitting made of plastic.

14. The device according to claim 13, wherein the gas inlet of the device is integrated into the end fitting.

15. The device according to claim 1, wherein the lower side of the aerating element is airtight, and comprises no holes or perforations.

16. The device according to claim 1, wherein the upper side of the aerating element comprises perforated areas interrupted by airtight strips that run in the longitudinal and/or transverse direction of the aerating element.

17. The device according to claim 1, having a rail for accommodating and stiffening the device.

* * * * *